No. 873,653. PATENTED DEC. 10, 1907.
W. C. BELCHER.
TEA KETTLE.
APPLICATION FILED MAR. 25, 1907.
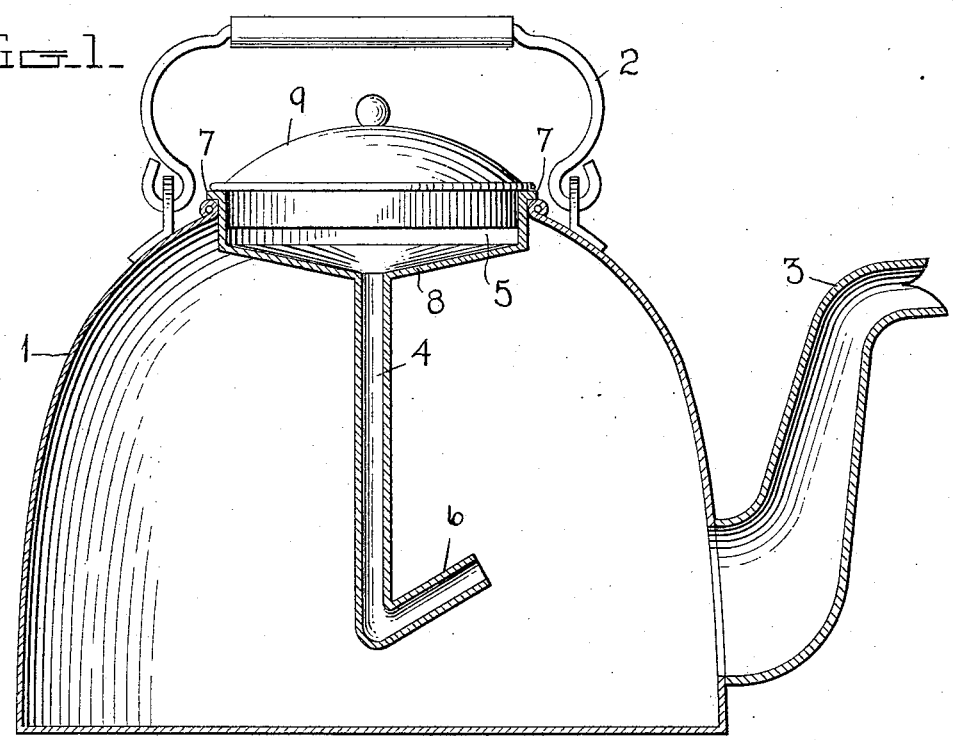
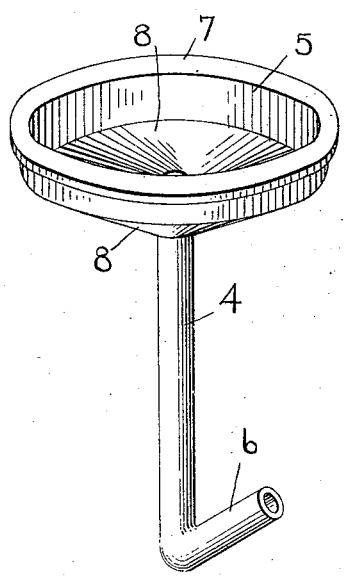
Witnesses
L. B. James
C. H. Griesbauer
Inventor
W. C. Belcher
by H. B. Willson & Co
Attorneys

UNITED STATES PATENT OFFICE.

WINNER C. BELCHER, OF COLFAX, CALIFORNIA.

TEA-KETTLE.

No. 873,653.　　　Specification of Letters Patent.　　　Patented Dec. 10, 1907.

Application filed March 25, 1907. Serial No. 364,471.

*To all whom it may concern:*

Be it known that I, WINNER C. BELCHER, a citizen of the United States, residing at Colfax, in the county of Placer and State of California, have invented certain new and useful Improvements in Tea-Kettles; and I do declare the following to be a full, clear, and exact description of the invention, such as will enable others skilled in the art to which it appertains to make and use the same.

My invention has relation to new and useful improvements in tea kettles, and has for its main object to provide means to prevent steam from escaping from a tea kettle beneath the hands of the user and scalding them.

With this and other ends in view, as will readily appear as the nature of the invention is better understood, my invention consists of certain novel features of construction and combination of parts, illustrated in the drawings and particularly pointed out in the specification and claims hereunto appended.

In the accompanying drawings,—Figure 1 is a vertical sectional view of a tea kettle constructed in accordance with my invention; Fig. 2 is a perspective view of the funnel attachment.

Referring more particularly to the drawings, the numeral 1 represents a tea kettle of common form having the usual mouth and provided with a handle 2 and spout 3. A funnel, comprising a vertical funnel pipe 4 which terminates at its upper end in a funnel head 5, and has an elbow in its lower part to provide an oblique, forwardly extending outlet pipe 6, which extends upwardly and forwardly toward the spout of the tea kettle at an angle of about forty-five degrees with respect to said pipe 4, fits in said kettle. Said funnel head 5 is preferably made in the form of a basin, having an outwardly extending annular flange 7 and a slanting bottom 8. Said funnel head 5 fits in the tea kettle mouth and is held in position by means of said annular bearing flange 7, the mouth of the funnel being closed by means of a lid or cover 9 fitted therein.

In the application of my invention, the kettle is supplied with water by means of said funnel. While said outlet pipe 6 serves to prevent any steam generated within the kettle from issuing out of the lid, and thereby scalding the hands of the user, it does not in the slightest degree retard the flow of the water when filling the kettle. Owing to the pipe 6 being upwardly inclined there is formed at the lower end of the pipe 4 an elbow, which will at all times hold sufficient water to seal the lower end of the filling pipe and prevent the steam escaping upwardly therethrough. My funnel does not have to be removed from the kettle except when the user is desirous of cleaning the inside of the same.

From the foregoing description, taken in connection with the drawings, the construction and combination of parts of my invention, will be understood without a more extended explanation.

Having described my invention, I claim:—

A kettle provided with a mouth and with a discharge spout, a funnel removably seated in said mouth and having an outturned supporting flange designed to rest on the marginal wall of the mouth for sustaining the funnel, the latter being provided with a vertical depending tube terminating near the bottom of the kettle in an upwardly inclined outlet portion opening toward said discharge spout, said tube including the outlet portion being wholly open and unobstructed, and a cover for closing the mouth of the funnel.

In testimony whereof I have hereunto set my hand in presence of two subscribing witnesses.

WINNER C. BELCHER.

Witnesses:
　B. J. GHENT,
　GEO. MURLEY.